United States Patent [19]
Kunze et al.

[11] Patent Number: 5,583,719
[45] Date of Patent: Dec. 10, 1996

[54] MAGNETIC HEAD MOUNTING ARRANGEMENT FOR A REVERSIBLE DRIVE TAPE CASSETTE APPARATUS

[75] Inventors: Norbert Kunze, Ehringshausen; Dieter Müller, Staufenberg, both of Germany

[73] Assignee: U.S. Philips Corporation, New York, N.Y.

[21] Appl. No.: 385,493

[22] Filed: Feb. 8, 1995

[30] Foreign Application Priority Data

Feb. 15, 1994 [DE] Germany ........................ 44 04 687.1

[51] Int. Cl.$^6$ .............................. G11B 5/54; G11B 15/00; G11B 21/16
[52] U.S. Cl. ........................................ 360/96.2; 360/105
[58] Field of Search ........................... 360/93, 96.1, 96.2, 360/96.5, 105, 137

[56] References Cited

U.S. PATENT DOCUMENTS

| | | | |
|---|---|---|---|
| 4,309,733 | 1/1982 | Tomabechi | 360/96.1 |
| 4,625,251 | 11/1986 | Tomita et al. | 360/96.1 |
| 4,636,889 | 1/1987 | Deutsch et al. | 360/96.2 |
| 4,661,866 | 4/1987 | Kunze | 360/96.1 |
| 4,743,986 | 5/1988 | Klös-Hein | 360/96.1 |
| 4,977,787 | 12/1990 | Klös-Hein et al. | 360/137 |
| 5,023,742 | 6/1991 | Kunze | 360/96.2 |
| 5,063,455 | 11/1991 | Yoshimura | 360/96.1 |

FOREIGN PATENT DOCUMENTS

| | | | |
|---|---|---|---|
| 3312134 | 4/1984 | Germany . | |
| 4017434A2 | 1/1991 | Germany . | |
| 2079028 | 1/1982 | United Kingdom | 360/96.2 |

*Primary Examiner*—Jefferson Evans
*Attorney, Agent, or Firm*—Brian J. Wieghaus; David R. Treacy

[57] ABSTRACT

A reversible tape cassette drive includes a support plate which is displaceable with respect to the magnetic tape and is also pivotable about a pivot axis. By pivoting the support plate, a selected one of two pressure rollers is driven against a corresponding capstan to control the direction of tape movement. The magnetic head is pivotally mounted on the support plate about the pivot axis. Straight guides guide the head to be perpendicular to the tape independent of the pivoting of the support plate.

8 Claims, 6 Drawing Sheets

MAGNETIC HEAD MOUNTING ARRANGEMENT FOR A REVERSIBLE DRIVE TAPE CASSETTE APPARATUS

BACKGROUND OF THE INVENTION

1. Field of the Invention

The invention relates to a magnetic head and its mounting arrangement on the reversible drive of a magnetic tape cassette apparatus in which the magnetic tape is passed along at least one magnetic recording/playback head which is arranged on a support plate. The plate is pivotable about a pivot axis and is in addition displaceable relative to the magnetic tape, such that either of two pressure rollers arranged on the support plate can be driven against the associated capstan as a result of a controlled pivoting movement, whereby the tape movement direction is defined.

2. Description of the Prior Art

DE 33 12 134 C1 discloses a reversible drive of this kind. In this reversible drive, the direction of movement is defined by means of a guide slot arrangement in a control plate which is movable to and fro in the direction of tape passage and which determines the pivoting direction during the reciprocal movement of the support plate between the playback position and the standby position of the support plate.

The magnetic head is fixedly connected to the support plate. The magnetic head accordingly rotates along with the two tape guide elements fastened thereto, which elements thus have a changing contact with the tape in dependence on the playing direction. However, it has also been proven that a drive fired with four tape guides has improved tape passage properties. When a magnetic head with these four tape guides pivots along with the pivotal support plate in a drive, the improvement provided by the four tape guides is not realized.

SUMMARY OF THE INVENTION

It is an object of the invention to provide a device of the kind mentioned in the opening paragraph wherein the effect of the four tape guide elements is retained in spite of rotation of the support plate, while in addition the magnetic gaps at the head face of the magnetic head are always in the same position seen from the head face center in every pivotal position.

According to the invention, this object is achieved in that the magnetic head is journalled on the support plate for relative rotation about the pivot axis thereof, and straight guides are provided which guide the magnetic head perpendicular to the magnetic tape at all times independently of the pivotal position of the support plate.

Since the position of the magnetic head is dependent on the straight guides and no longer on the pivotal position of the support plate, an optimum contact between magnetic tape, magnetic head, and tape guide elements is safeguarded.

In a further embodiment of the invention, one straight guide comprises a groove which extends perpendicularly to the magnetic tape and is fixed relative to the frame, in which groove a spindle is guided. This spindle forms the pivot for the support plate and includes a journal for the head support and the magnetic head on the support plate. A second straight guide comprises a groove which extends perpendicularly to the magnetic tape and is fixed relative to the frame, in which groove a pin of the head support is guided. This second straight guide may open into a funnel or region in which the pin is free from contact with the groove walls.

Thus this pin may be moved into a region which is not occupied by other components.

In a further embodiment of the invention, another straight guide of the magnetic head comprises guide pins fixed relative to the frame, which pins enter retaining slots of the head support when the magnetic head enters the playback position and provide the magnetic head with a lateral level guidance with respect to the width dimension of the magnetic tape.

In a further embodiment of the invention, the head support comprises edges with which it bears on abutment stops fixed relative to the frame, whereby a wedging effect is achieved and thus a positioning of the head support/magnetic head in the drive free from play between the frame and the head support with respect to both perpendicularity and lateral level guidance.

The invention will be explained in more detail with reference to the drawings

BRIEF DESCRIPTION OF THE DRAWING

FIG. 5 shows the cooperation in the standby position, FIG. 6 shows the cooperation in the playback position, and FIG. 7 shows the cooperation in the fast winding position.

DESCRIPTION OF THE PREFERRED EMBODIMENT

Figure 1:
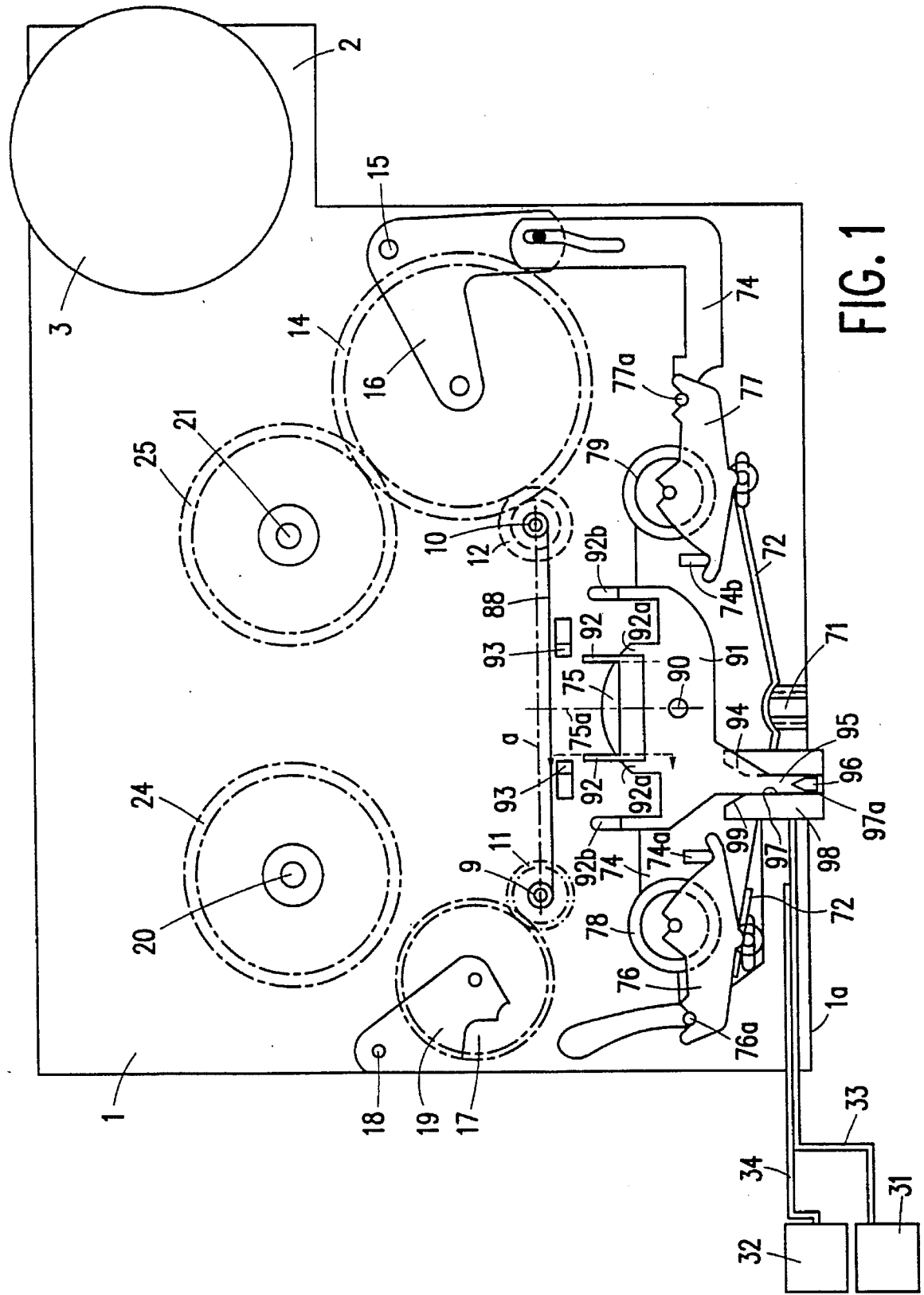
FIG. 1 shows a portion of a drive of a magnetic tape cassette apparatus with a support plate guiding the magnetic head in the standby position.

As is shown in FIG. 1, the magnetic tape cassette apparatus according to the invention comprises a frame 1 which carries a unidirectional drive motor 3, on a support 2. A drive pinion of the motor 3 drives a belt which drives flywheels (not shown) via idlers such that the flywheels turn in opposite directions. The flywheels are journalled in the frame 1. One of the flywheels is fixedly connected to a first capstan 9, and the other flywheel is fixedly connected to a second capstan 10. Furthermore, the first flywheel is connected to a gear 11, the other flywheel to a gear 12. A further gear is rotatably arranged on the flywheel of capstan 10 coaxially with the gear 12 via a fiction coupling, so as to be in continuous engagement with a switching wheel 14 formed as a gear. This switching wheel 14 is pivotable about a shaft 15. The shaft 15 supports a pivot arm 16 (diagrammatically depicted in FIG. 1) on which the switching wheel 14 has its rotation bearings. A gear 17 is continuously in engagement with the gear 11 in a similar manner. This gear 17 is rotatable about a pivot 18 by means of a diagrammatically depicted pivot arm 19.

As FIG. 1 shows, spool hubs 20 and 21 have their rotation beatings in the frame 1. These hubs 20 and 21 are fixedly connected to winding wheels. The hubs 20, 21 are connected to playback wheels 24, 25 via fiction couplings.

For fast winding and rewinding, two buttons 31 and 32, which can achieve the fast winding and rewinding function via button mechanisms 33 and 34 in a manner not shown, have been indicated.

Figure 2:
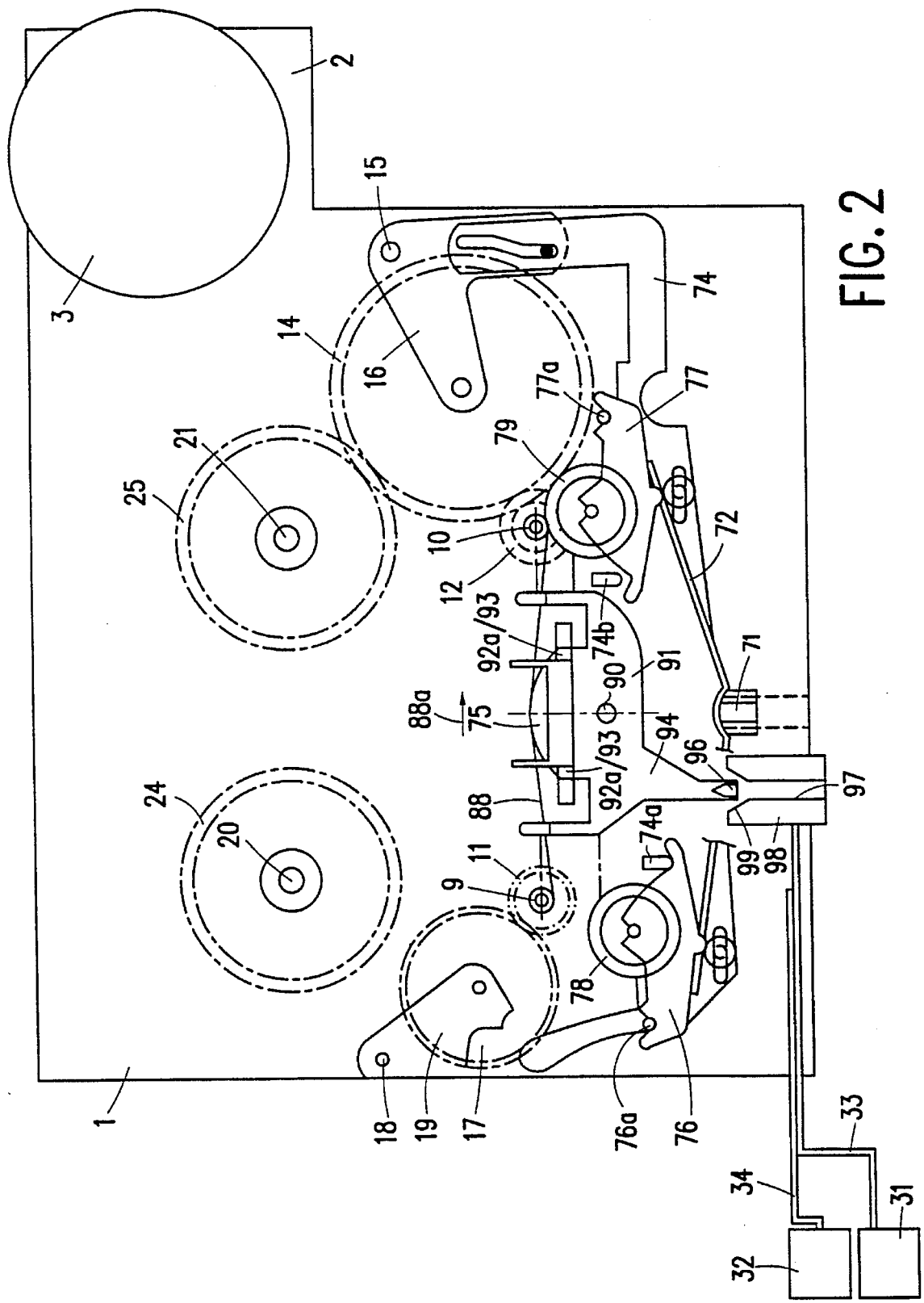
FIG. 2 shows the drive with support plate and magnetic head in the playback position for a first tape passage direction.
Figure 3:
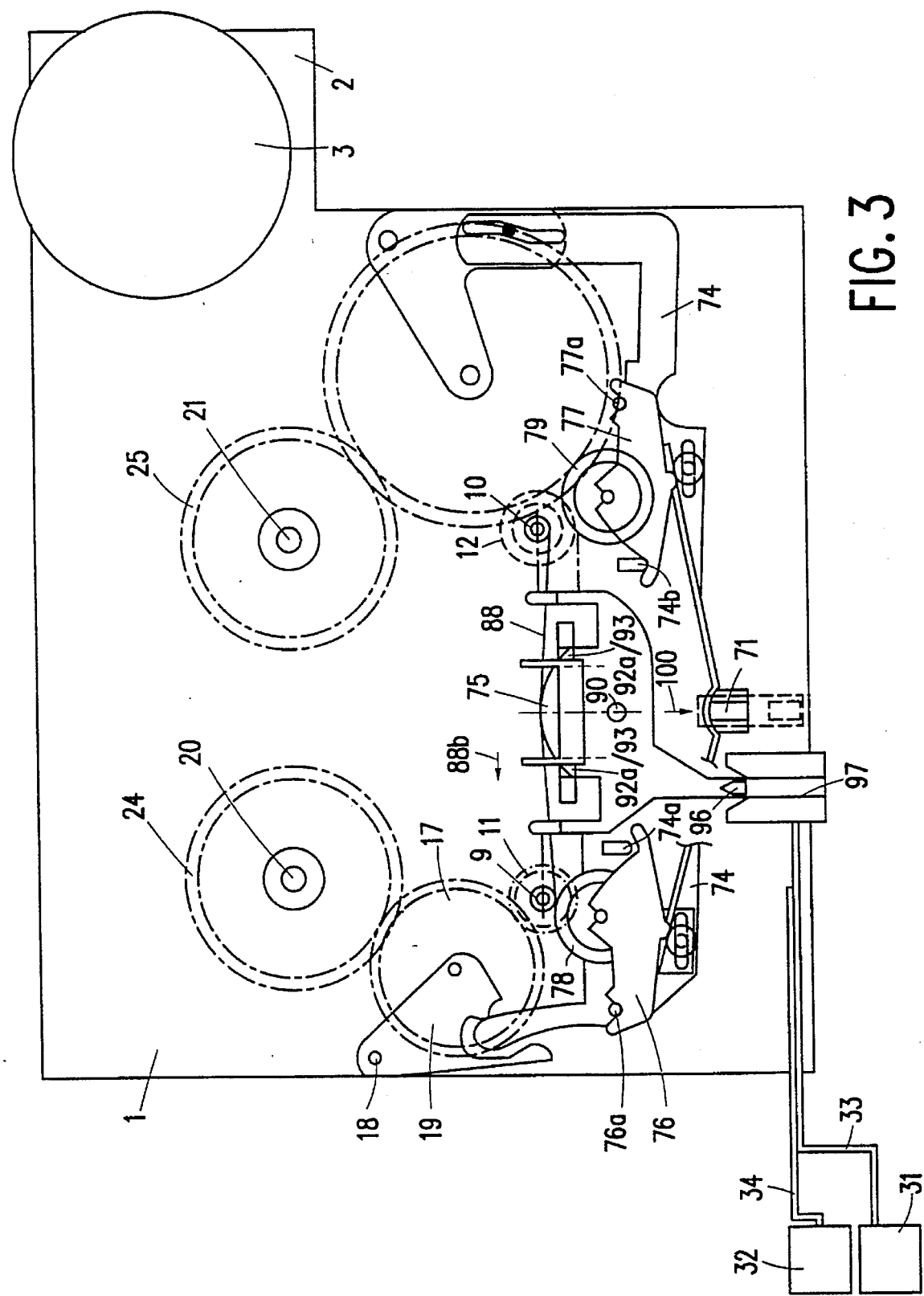
FIG. 3 shows the drive with support plate and magnetic head in the playback position for a second, opposed tape passage direction.

A stud 71 is provided, which can act on a blade spring 72. A support plate 74 for a magnetic head 75 can be moved against a magnetic tape 76 by means of the stud 71 and the blade spring 72. The blade spring 72 for this purpose presses with its free ends against holders 76 and 77 in which pressure rollers 78 and 79 have their bearings. The holders are pressed against stops 74a, 74b and 76a, 76b of the support plate 74. As FIGS. 2 and 3 show, the support plate 74 can pivot about a pivot spindle 90. This pivoting movement is effected by a control device which is not shown.

A head support 91 has its rotation bearings on the pivot spindle 90 so that it can pivot relative to the support plate 74. The magnetic head 75 is exactly positioned on the head support 91, for example through clamping. On either side of the magnetic head 75 there are inner tape guides 92 and tape guides 92b situated further to the outside. The inner tape guides 92 are laterally provided with retaining slots 92a into which the guide pins 93 can enter when the head support 91 with the magnetic head 75 is shifted towards the magnetic tape 88. The guide pins 93 together with the retaining slots 92a form straight guides in the immediate vicinity of the contact area between magnetic tape 88 and head 75.

The head support 91 is provided with a guide arm 94 which carries a support pin 96 at its free end 95. This pin 96 slides in the region of a groove 97 which is fixed relative to the frame and which is formed between guide mils 98. The frame groove 97 has a constant width up to the edge 1a of the frame 1 and can exactly guide the pin 96 in this region of constant width. The groove 97 extends perpendicularly to a connecting line a between the capstans 9 and 10, and thus also perpendicular to the magnetic tape 88 tensioned between the capstans 9 and 10. When the support plate 74 and the pivot spindle 90 are shifted perpendicularly to the magnetic tape 88, the pin 96 sliding in the groove 97 thus always assures that the position of head 75 is perpendicular to the magnetic tape 88 and the line a. The groove 97 opens out towards the magnetic tape 88 and the line a into a funnel 99. This arrangement is further explained with reference to FIGS. 2 to 4.

FIG. 1 shows the standby position of the drive, in which the support plate 74 has clearly moved the magnetic head 75 away from the operational area of the magnetic tape 88. In this position, the pin 96 is in the lower end region 97a of frame groove 97. The head support 91 is securely guided in this case by the pin 96, and the centerline 95a of the magnetic head is definitely perpendicular to the line a.

FIG. 2 shows a state of the drive in which the magnetic tape 88 is moved in a first tape passage direction indicated with an arrow 88a. The support plate 74 with the head support 91 has been moved towards the tape 88, and the tape 88 has entered the tape guides 92, 92b; it lies against the magnetic head 75. Now the guide pins 93 are inside the retaining slots 92a and provide a straight guide to the head support 91 in the immediate vicinity of the head 75. The head support 91 then lies with its bevelled edges 92d against the guide pins 93 and is thus aligned parallel to the tape and wedged level and free from play in the height direction with respect to the width direction of the tape. To avoid undesirable interactions between this straight guide and the one between the guide rails 98, the guide arm 94 has now left the groove 97 and has entered the funnel region 99 in which the pin 96 is no longer guided in the groove 97. In this first playing direction, the pressure roller 79 lies against the capstan 10. The holder 77 has lifted itself away from the stop 74b owing to the pressure.

To change the tape passage direction, the support plate 74 is moved back in the direction of an arrow 100, and the control unit ensures that the pivoting direction of the support plate 74 is reversed. The adjustment of the pivoting direction is effected by the control unit which is not shown. When the support plate 74 has been moved back, the pin 96 will again be in the groove 97. When the support plate is again moved towards the magnetic tape 88, the pin 96 will leave the groove 97 again, while at the same time the guide pins 93 enter the retaining slots 92a. The straight guide is then again moved from the guide rails 98 at the edge 1a of the frame 1 into the immediate vicinity of the magnetic head 75. In the case pictured in FIG. 3, the pressure roller 78 presses against the capstan 9, and the magnetic tape is now pulled away in the direction of an arrow 88b in opposite direction, to the left, over the magnetic head 75. The holder 76 has lifted itself from the stop 74a because of the pressure exerted by the pressure roller 78 on the capstan 9.

Figure 4:
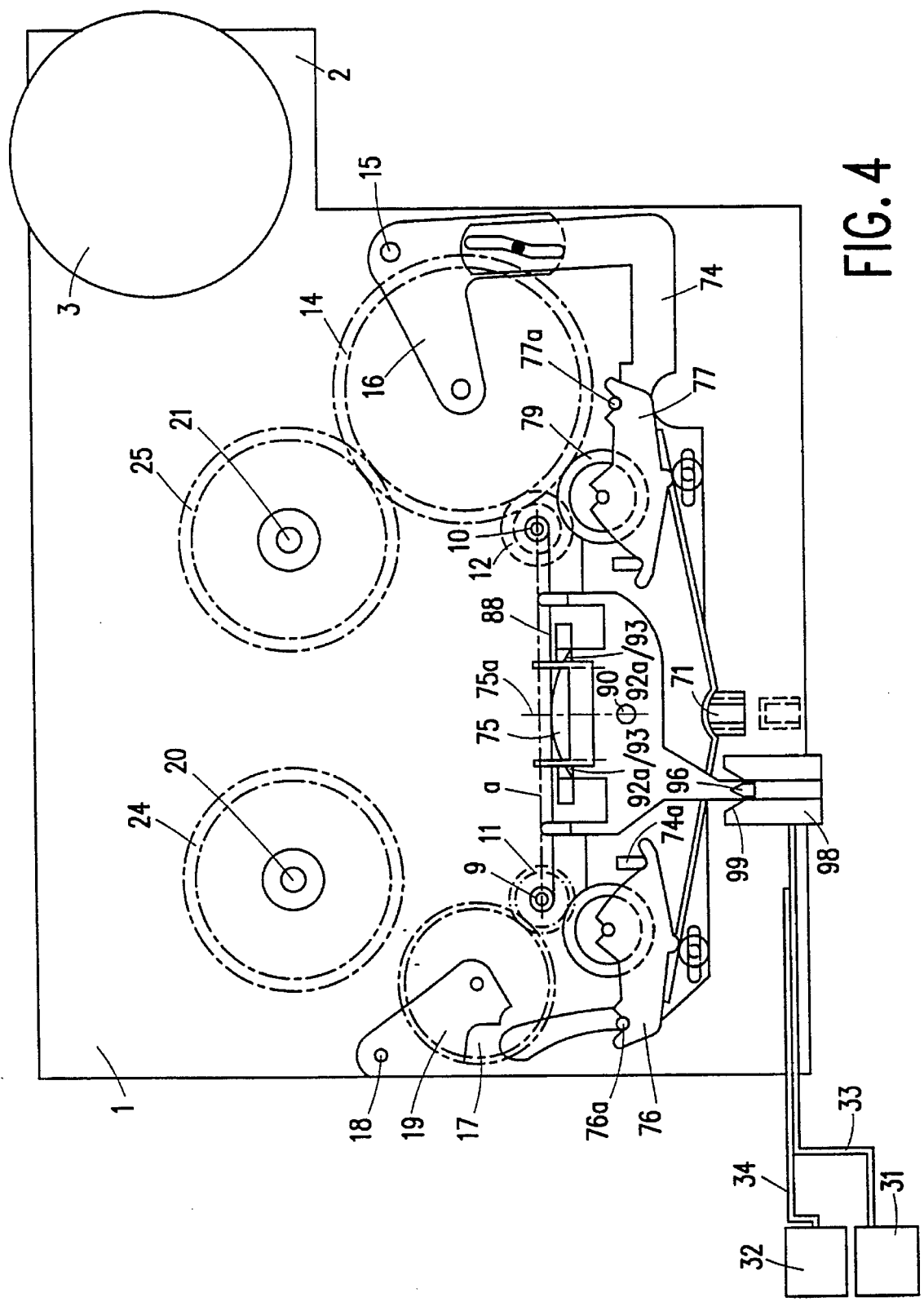
FIG. 4 shows the drive with support plate and magnetic head in a fast winding position, in which the magnetic tape is scanned only lightly.

FIG. 4 shows a fast-winding position in which the magnetic tape 88 just touches the magnetic head 75 lightly. In this position, the pin 96 is still just in the parallel guiding region of groove 97. The straight guide in the region of the guide rails 98 is still active then, while the straight guide in the region of the guide pins 93 with retaining slots 92a is also still active. The support 91 with the magnetic head 75 is therefore still guided such that the magnetic head 75 is perpendicular to the direction of passage of the magnetic tape 88 at its centerline 75a. Only the stop 92d is not active any more.

It is safeguarded in this manner that the magnetic head always assumes its optimum position relative to the magnetic tape 88, irrespective of whether the support plate 74 is pivoted relative to the tape passage direction or not.

Figure 5:
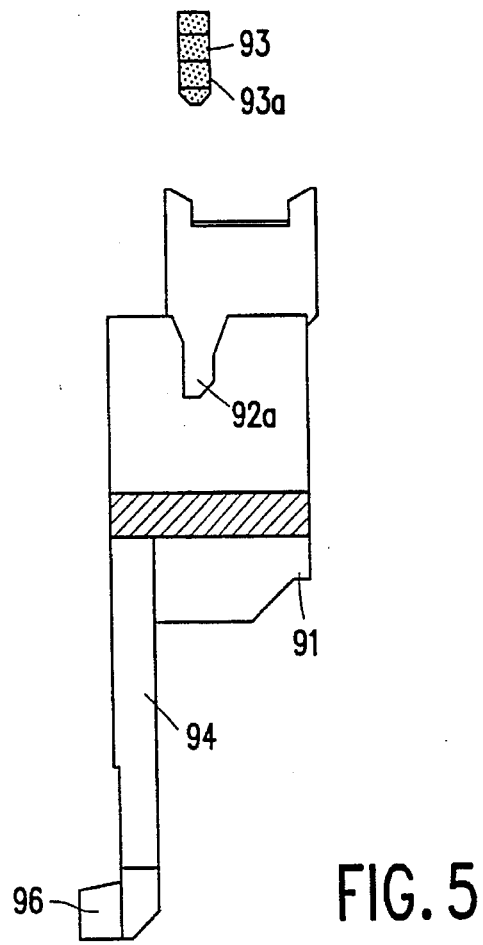
FIGS. 5 to 7 are elevations on an enlarged scale of the operating principles of straight guides in the vicinity of the magnetic head, where
Figure 6:
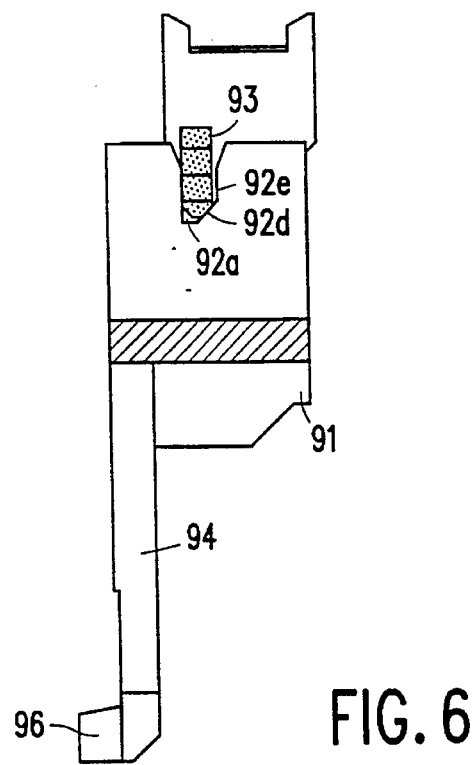

FIG. 5 shows the head support on an enlarged scale and in a cross-section for a better view of the cooperation of the guide pins 93 and retaining slots 92a. In FIG. 1, the support plate 74 has been returned to its standby position together with the head support 91. In that case, the retaining slots 92a and the guide pins 93 are far away from one another. This is shown on an enlarged scale by FIG. 5. When the support plate 74 together with the head support 91 enters the playback position now, irrespective of whether this relates to the first or second tape passage direction, the retaining slots 92a are moved over the guide pins 93. This position is shown in FIG. 6, where the upper straight guides 92a/93 and the stop 92d exactly define the position of the magnetic head 75.

Figure 7:
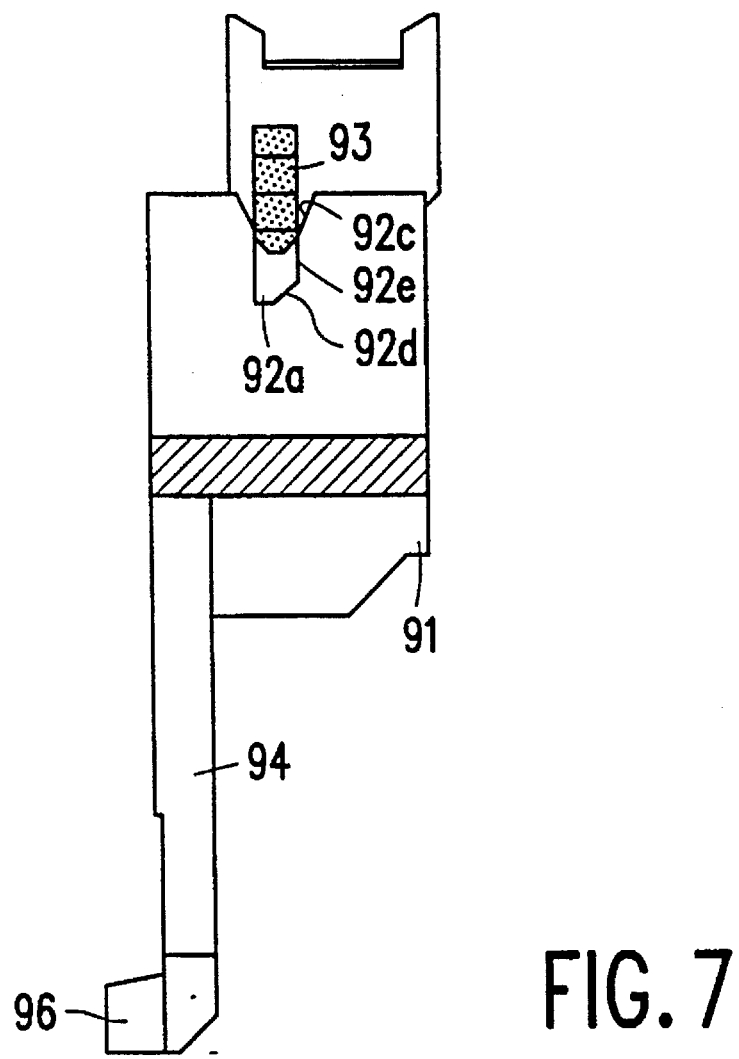

FIG. 7 shows the lateral level and height intermediate position for fast winding as depicted in FIG. 4. In this case, the retaining slots 92a have been returned over some distance. The guiding of the retaining slots 92a is still provided because the wall 93a (see FIG. 5) of the pin 93 is still in contact with the slot wall 92e, while perpendicularity is provided by the pin 96 within the groove 97.

We claim:

1. A magnetic head and mounting arrangement therefor for a reversible drive of a magnetic tape cassette apparatus comprising a support plate and at least one magnetic recording/playback head mounted on the support plate, in which a magnetic tape is passed selectively along said at least one magnetic recording/playback head in either of two directions of tape movement, comprising:

two pressure rollers arranged on the support plate, two capstans arranged for driving said tape in opposite directions, each capstan being disposed opposite a respective associated pressure roller, and means for mounting said plate to be pivotable about a pivot axis and displaceable relative to the tape, and for bringing either of said pressure rollers into a driving position against the respective associated capstan to define the direction of tape movement, characterized in that the device further comprises:

means for journalling said magnetic head on said support plate for relative pivotal movement with respect to the support plate about said pivot axis, and straight guidance means for guiding the magnetic head, to be at all times substantially perpendicular to the tape, independently of the pivotal position of the support plate.

2. A magnetic head and mounting arrangement as claimed in claim 1, further comprising a frame to which said capstans are mounted for rotation, and a head support to which the magnetic head is fixed, characterized in that:

said straight guidance means comprises a straight groove which extends perpendicularly to the tape and is fixed relative to the frame, and said head support comprises a support pin which is guided in said groove.

3. A magnetic head and mounting arrangement as claimed in claim 1, further comprising a frame to which said capstans are mounted for rotation, and a head support to which the magnetic head is fixed, characterized in that:

the arrangement comprises at least two abutment stops fixed relative to the frame, and the head support comprises at least two edges which bear against said abutment stops when the magnetic head is in the playback position, for achieving a wedging effect to position the magnetic head, with respect to the frame, without play.

4. A magnetic head and mounting arrangement as claimed in claim 1, further comprising a frame to which said capstans are mounted for rotation, and a head support to which the magnetic head is fixed, characterized in that:

said head support comprises a retaining slot, and said straight guidance means comprises a guide pin fixed relative to said frame, arranged to enter said retaining slot when the magnetic head is moved to a playback position, said retaining slot providing lateral level guidance to said magnetic head with respect to the width dimension of the tape.

5. A magnetic head and mounting arrangement as claimed in claim 4, characterized in that:

said head support comprises two said retaining slots, and said straight guidance means comprises two said guide pins fixed relative to said frame, each arranged to enter a respective retaining slot when the magnetic head is moved to said playback position.

6. A magnetic head and mounting arrangement as claimed in claim 1, further comprising a frame to which said capstans are mounted for rotation, and a head support to which the magnetic head is fixed, characterized in that:

said straight guidance means comprises a groove which extends perpendicularly to the tape and is fixed relative to the frame, and a guide pin fixed relative to said frame, said head support comprises a retaining slot, and a support pin which is guided in said groove, and said guide pin is arranged to enter said retaining slot when the magnetic head is moved to a playback position, said retaining slot providing alignment of the magnetic head parallel to the tape, and lateral level guidance to said magnetic head with respect to the width dimension of the tape.

7. A magnetic head and mounting arrangement as claimed in claim 6, characterized in that:

said head support comprises two said retaining slots, and said straight guidance means comprises two said guide pins fixed relative to said frame, each arranged to enter a respective retaining slot when the magnetic head is moved to the playback position.

8. A magnetic head and mounting arrangement as claimed in claim 7, characterized in that:

said guide pins each include a respective surface formed as an abutment stop, and said retaining slots each include a respective edge which bears against a corresponding abutment stop when the magnetic head is in the playback position, for achieving a wedging effect to position the magnetic head, with respect to the frame, without play.

* * * * *